United States Patent
Grossman et al.

(10) Patent No.: US 8,047,047 B2
(45) Date of Patent: Nov. 1, 2011

(54) INERTIAL SENSOR MISALIGNMENT AND COMPENSATION

(75) Inventors: Owen Grossman, Golden Valley, MN (US); Lawrence C. Vallot, Lake Elmo, MN (US)

(73) Assignee: Honeywell International Inc., Morristown, NJ (US)

( * ) Notice: Subject to any disclaimer, the term of this patent is extended or adjusted under 35 U.S.C. 154(b) by 800 days.

(21) Appl. No.: 12/122,555

(22) Filed: May 16, 2008

(65) Prior Publication Data
US 2009/0282894 A1 Nov. 19, 2009

(51) Int. Cl.
*G01C 17/38* (2006.01)
(52) U.S. Cl. .......................................... 73/1.75
(58) Field of Classification Search ................ None
See application file for complete search history.

(56) References Cited

U.S. PATENT DOCUMENTS

| | | | |
|---|---|---|---|
| 4,816,759 A | 3/1989 | Ames et al. | |
| 4,879,918 A * | 11/1989 | Hojo et al. | 74/5.47 |
| 5,247,748 A | 9/1993 | Hojo | |
| 5,559,598 A | 9/1996 | Matsumoto | |
| 5,617,023 A | 4/1997 | Skalski | |
| 5,896,200 A | 4/1999 | Shu | |
| 6,196,514 B1 * | 3/2001 | Kienholz | 248/550 |
| 6,763,318 B1 | 7/2004 | Winter et al. | |
| 6,826,478 B2 | 11/2004 | Riewe et al. | |
| 7,337,650 B1 | 3/2008 | Preston et al. | |
| 7,370,428 B2 * | 5/2008 | Decker, Jr. | 33/366.11 |
| 2003/0098972 A1 | 5/2003 | McMillan et al. | |
| 2005/0283330 A1 | 12/2005 | Laraia et al. | |
| 2006/0058946 A1 | 3/2006 | Chappell | |

FOREIGN PATENT DOCUMENTS

JP 2001153658 6/2001

OTHER PUBLICATIONS

European Patent Office, "European Search Report," Nov. 3, 2009, Published in: EP.

* cited by examiner

Primary Examiner — Robert Raevis
(74) Attorney, Agent, or Firm — Fogg & Powers LLC

(57) ABSTRACT

An apparatus for providing information pertaining to the orientation of a vehicle to which the apparatus is coupled includes a chassis having a first interior surface and an inertial-sensor assembly disposed within the chassis and having a first exterior surface. A first sensor element is mounted on the first interior surface, and a second sensor element is mounted on the first exterior surface. At least one of the first and second sensor elements is configured to generate a first signal corresponding to a distance of displacement of the second sensor element with respect to the first sensor element.

18 Claims, 3 Drawing Sheets

INERTIAL SENSOR MISALIGNMENT AND COMPENSATION

BACKGROUND OF THE INVENTION

Certain inertial reference systems, such as those associated with aircraft navigation, for example, require the inertial sensors (e.g., gyroscopes, accelerometers, etc.) to be mechanically isolated from the rest of the system in order to attain the required inertial sensor accuracy and reliability. Referring to FIG. 1, for example, an inertial-sensor assembly (ISA) 10 may be mounted within an enclosure or chassis 20 and vibration isolated from the chassis through the use of, for example, elastomeric isolators 30 operable to reduce sensor vibration exposure.

However, such an isolation scheme allows the ISA 10 to rotate through an angle 40 relative to the chassis 20 and, as such, the vehicle for which accurate spatial-orientation information is required. This may be due to a number of factors such as temperature, linear and angular acceleration, age, etc. Although, for purposes of clarity, rotation of the ISA 10 in a one-dimensional plane is shown in the drawing figures, the ISA is free to rotate slightly in all three dimensions. In conventional strapdown inertial navigation system arrangements, this rotational motion of the ISA 10 is generally unmeasured or otherwise unaccounted for in the inertial navigation solution calculated by a processing device 50 in signal communication with the ISA. Further, this motion degrades the knowledge of the chassis 20 orientation, even if the ISA 10 orientation is perfectly known.

As such, a mechanical isolation may itself be a source of misalignment error. Moreover, a typical navigation system does not, with great accuracy, take into account mechanical misalignment between the system chassis and the mechanically isolated ISA.

SUMMARY OF THE INVENTION

In an embodiment, an apparatus for providing information pertaining to the orientation of a vehicle to which the apparatus is coupled includes a chassis having a first interior surface and an inertial-sensor assembly disposed within the chassis and having a first exterior surface. A first sensor element is mounted on the first interior surface, and a second sensor element is mounted on the first exterior surface. At least one of the first and second sensor elements is configured to generate a first signal corresponding to a distance of displacement of the second sensor element with respect to the first sensor element.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment of the invention enables a method of non-contact measure of the angular relationship between a navigation system chassis and an ISA. These measures of angle can then be incorporated into the inertial-reference computation to correct for mechanical misalignment within the system.

Figure 1:
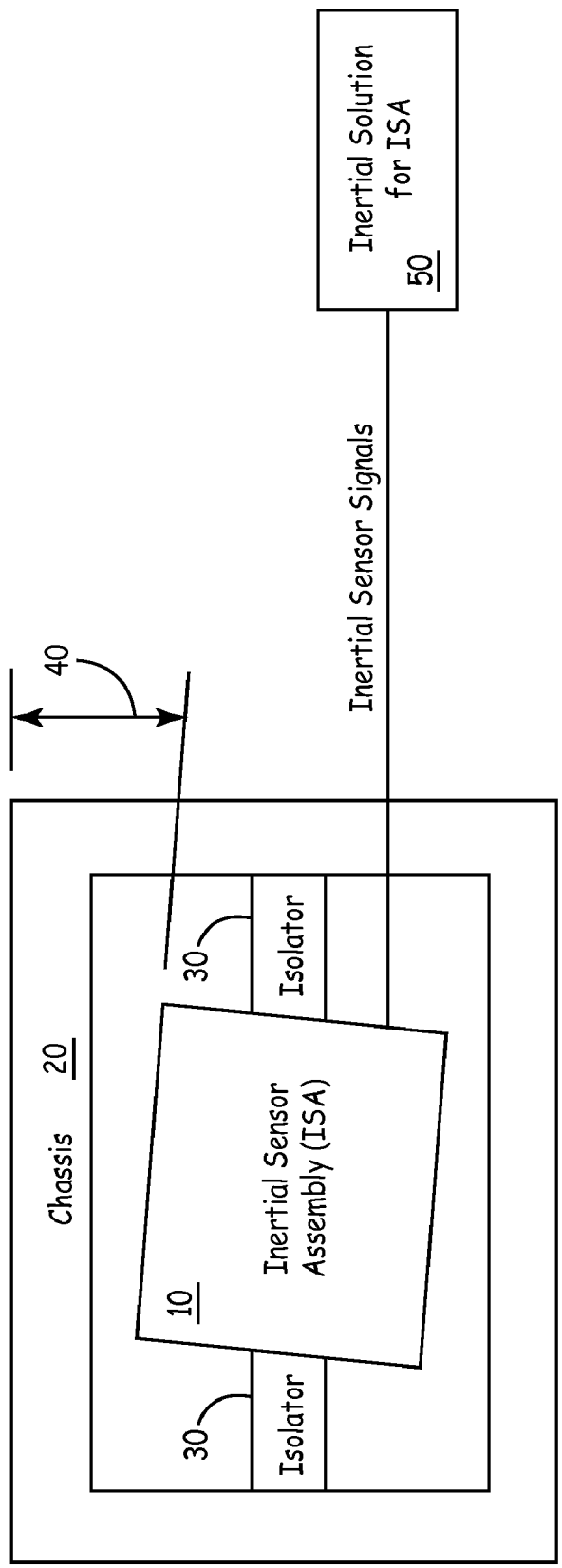
FIG. 1 is a schematic view of a prior-art apparatus.
Figure 2:
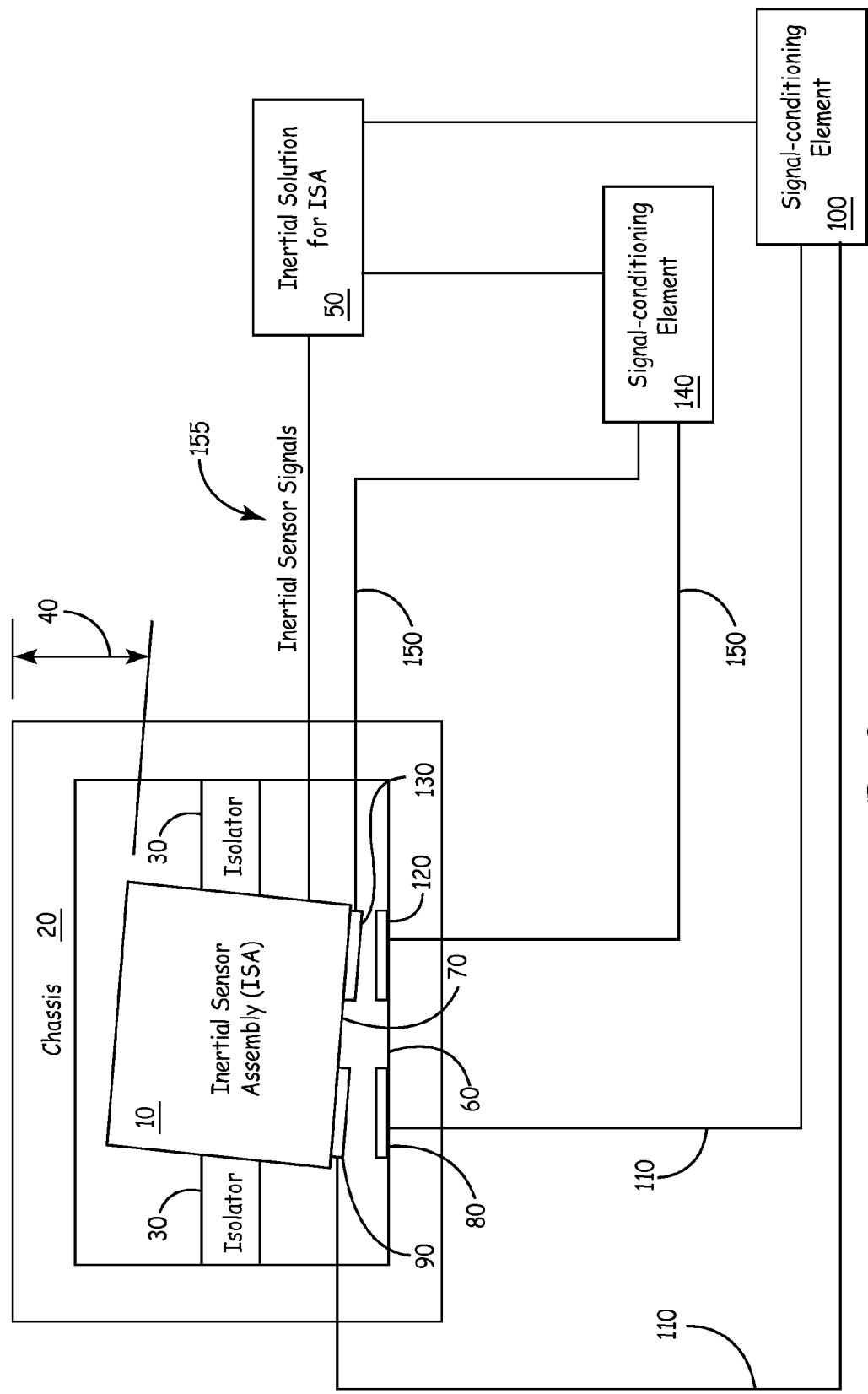
FIG. 2 is a schematic view of an apparatus according to an embodiment of the present invention.

Referring now to FIG. 2, illustrated is an apparatus according to a first embodiment of the present invention. Like reference numerals are used for elements like those illustrated in FIG. 1. As such, shown is a chassis 20 having a first interior surface 60 and an ISA 10 disposed within the chassis and having a first exterior surface 70. A first sensor element 80 is mounted on the first interior surface 60, and a second sensor element 90 is mounted on the first exterior surface 70. In the embodiment illustrated in FIG. 2, the first and second sensors 80, 90 include first and second capacitors combined in a capacitive pick-off configuration. At least one of the first and second sensor elements 80, 90 is configured to generate at least one signal corresponding to a distance of displacement of the second sensor element 90 with respect to the first sensor element 80. These signals can be transmitted from the first and second sensor elements 80, 90 to a signal-conditioning element 100, which may include a capacitance bridge, via respective conductive elements, such as cables 110. Alternatively, such signals could be communicated to the conditioning element 100 via known wireless techniques.

The embodiment illustrated in FIG. 2 further includes third and fourth sensor elements 120, 130, which may likewise be capacitors combined in a capacitive pick-off configuration. At least one of the third and fourth sensor elements 120, 130 is configured to generate at least one signal corresponding to a distance of displacement of the fourth sensor element 130 with respect to the third sensor element 120. These signals can be transmitted from the third and fourth sensor elements 120, 130 to a signal-conditioning element 140, similar to the element 100, via respective conductive elements, such as cables 150. Alternatively, such signals could be communicated to the conditioning element 140 via known wireless techniques.

An embodiment may employ three pairs of capacitive pick-offs, each such pair being similar in configuration and functionality to the pick-off pair including first and second sensor elements 80, 90 and third and fourth sensor elements 120, 130 illustrated in FIG. 2. In such an embodiment, the pick-off pairs can be oriented in three different mutually orthogonal axes. In other words, each pick-off pair (not shown) additional to the pair illustrated in FIG. 2 could include sensor elements mounted on interior surfaces of the chassis 20 and exterior surfaces of the ISA 10 at respective 90-degree angles with respect to surfaces 60 and 70. Each pair of sensors (e.g., first and second sensor elements 80, 90, third and fourth sensor elements 120, 130, etc.) may be spaced a baseline distance from one another corresponding to the chassis 20 being at rest. Differential distance of the chassis 20 to ISA 10 measured by the sensors over (or under) the baseline distance would be an indication of angular displacement 40 of the ISA with respect to the chassis. Measurement of up to three such angles indicated by up to three such pick-off pairs would enable a processing device 50 to calculate the spatial orientation of the ISA 10 with respect to the chassis 20. In turn, this spatial-orientation determination can then, along with inertial-sensor signals 155 received from the ISA 10, be incorporated into the inertial-reference computation to account for misalignment of the ISA with respect to the chassis 20.

In an embodiment, a capacitance bridge (not shown), designed to measure differential capacitance, could be substituted for the conditioning elements 100, 140. Such a bridge could be operable to supply differential distance calculation to the processing device 50.

Figure 3:
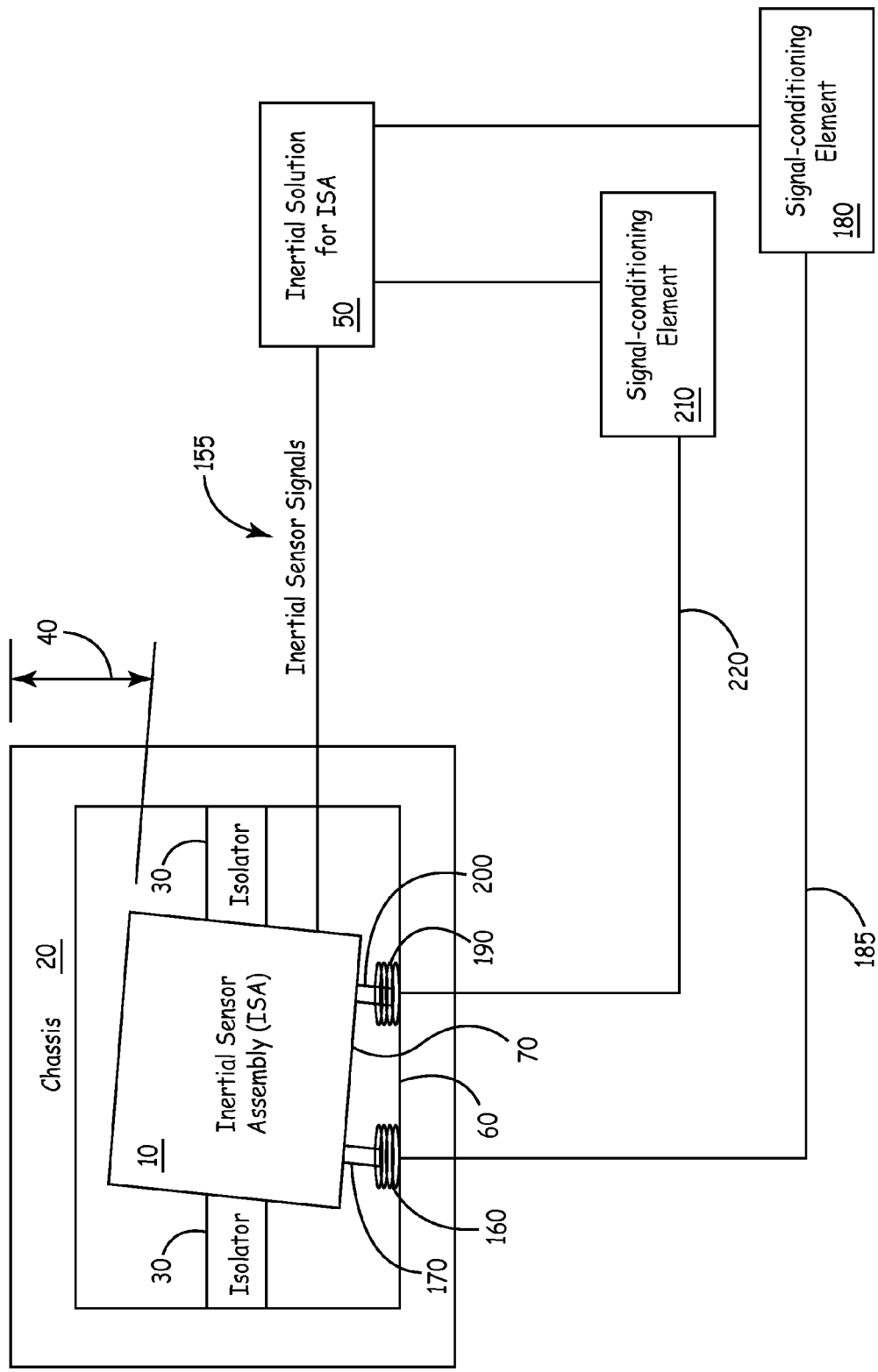
FIG. 3 is a schematic view of an apparatus according to an alternative embodiment of the present invention.

Referring now to FIG. 3, illustrated is an apparatus according to a second embodiment of the present invention. Like reference numerals are used for elements like those illustrated in FIGS. 1 and/or 2. As such, shown in a chassis 20 having a first interior surface 60 and an ISA 10 disposed within the chassis and having a first exterior surface 70. A first sensor element 160 is mounted on the first interior surface 60, and a second sensor element 170 is mounted on the first exterior surface 70. In the embodiment illustrated in FIG. 3, the first sensor element 160 includes a conductive coil, and the second sensor 170 includes a core, and the elements 160, 170 are combined in an inductive pick-off configuration. The first and second sensor elements 160, 170 are configured to generate at least one signal corresponding to a distance of displacement of the second sensor element 170 with respect to the first sensor element 160. These signals can be transmitted from the first and second sensor elements 160, 170 to a signal-conditioning element 180, which may include a demodulator and signal amplifier, via a conductive element, such as a cable 185. Alternatively, such signals could be communicated to the conditioning element 180 via known wireless techniques.

The embodiment illustrated in FIG. 3 further includes third and fourth sensor elements 190, 200, which may likewise be a coil/core pair combined in an inductive pick-off configuration. The third and fourth sensor elements 190, 200 are configured to generate at least one signal corresponding to a distance of displacement of the fourth sensor element 200 with respect to the third sensor element 190. These signals can be transmitted from the third and fourth sensor elements 190, 200 to a signal-conditioning element 210, similar to the element 180, via a conductive element, such as a cable 220. Alternatively, such signals could be communicated to the conditioning element 210 via known wireless techniques.

An embodiment may employ three pairs of inductive pick-offs, each such pair being similar in configuration and functionality to the pick-off pair including first and second sensor elements 160, 170 and third and fourth sensor elements 190, 200 illustrated in FIG. 3. In such an embodiment, the pick-off pairs can be oriented in three different mutually orthogonal axes. In other words, each pick-off pair (not shown) additional to the pair illustrated in FIG. 3 could include sensor elements mounted on interior surfaces of the chassis 20 and exterior surfaces of the ISA 10 at respective 90-degree angles with respect to surfaces 60 and 70. Each pair of sensors (e.g., first and second sensor elements 160, 170, third and fourth sensor elements 190, 200, etc.) may be spaced a baseline distance from one another corresponding to the chassis 20 being at rest. Differential distance of the chassis 20 to ISA 10 measured by the sensors over (or under) the baseline distance would be an indication of angular displacement 40 of the ISA with respect to the chassis. Measurement of up to three such angles indicated by up to three such pick-off pairs would enable a processing device 50 to calculate the spatial orientation of the ISA 10 with respect to the chassis 20. In turn, this spatial-orientation determination can then, along with inertial-sensor signals 155 received from the ISA 10, be incorporated into the inertial-reference computation to account for misalignment of the ISA with respect to the chassis 20.

While a preferred embodiment of the invention has been illustrated and described, as noted above, many changes can be made without departing from the spirit and scope of the invention. For example, an embodiment of the invention includes variable-resistance pick-offs in lieu of the capacitive and inductive pick-off arrangements discussed in detail herein. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for providing information pertaining to the orientation of an object to which the apparatus is coupled, the apparatus comprising:
    a chassis having a first interior surface and a second interior surface;
    an inertial-sensor assembly disposed within the chassis and having a first exterior surface and a second exterior surface;
    a first sensor element mounted on the first interior surface;
    a second sensor element mounted on the first exterior surface, at least one of the first and second sensor elements configured to generate a first signal corresponding to a distance of displacement of the second sensor element with respect to the first sensor element;
    a third sensor element mounted on the second interior surface;
    a fourth sensor element mounted on the second exterior surface, at least one of the third and fourth sensor elements configured to generate a second signal corresponding to a distance of displacement of the fourth sensor element with respect to the third sensor element; and
    a processing device coupled to at least one of the first and second sensor elements and configured to determine, based on the generated first signal, an angle of displacement of the first exterior surface with respect to the first interior surface.

2. The apparatus of claim 1, further comprising at least one signal-conditioning element interposed between at least one of the first and second sensor elements and the processing device and configured to convert the first signal into a third signal to be received by the processing device.

3. The apparatus of claim 2, wherein the first signal is transmitted to the at least one signal-conditioning element via a cable.

4. The apparatus of claim 1, wherein the processing device is further coupled to at least one of the third and fourth sensor elements and is further configured to determine, based on the generated second signal, an angle of displacement of the second exterior surface with respect to the second interior surface.

5. The apparatus of claim 1, wherein the first sensor element comprises a first capacitor plate and the second sensor element comprises a second capacitor plate.

6. The apparatus of claim 1, wherein the first sensor element comprises a conductive coil and the second sensor element comprises a core.

7. The apparatus of claim 1, wherein the processing device is further operable to determine an orientation solution for the object based on information provided by the inertial-sensor assembly and the determined angle of displacement of the first exterior surface with respect to the first interior surface.

8. The apparatus of claim 1, wherein the first interior surface is orthogonal to the second interior surface; and
    wherein the first exterior surface is orthogonal to the second exterior surface.

9. The apparatus of claim 1, wherein the first signal and the second signal are provided to a processor that determines an angle of displacement of the first exterior surface with respect to the first interior surface based on the first signal and the second signal.

10. A system comprising:
    an apparatus comprising:
        a chassis having a first interior surface and a second interior surface;

an inertial-sensor assembly disposed within the chassis and having a first exterior surface and a second exterior surface;

a first sensor element mounted on the first interior surface; and a second sensor element mounted on the first exterior surface, at least one of the first and second sensor elements configured to generate a first signal corresponding to a distance of displacement of the second sensor element with respect to the first sensor element; and a third sensor element mounted on the second interior surface; and a fourth sensor element mounted on the second exterior surface, at least one of the third and fourth sensor elements configured to generate a second signal corresponding to a distance of displacement of the fourth sensor element with respect to the third sensor element; and a computer-readable medium having stored thereon instructions that, when executed by an electronic device coupled to the at least one of the first and second sensor elements, enable the electronic device to:

determine, based on the generated first signal, an angle of displacement of the first exterior surface with respect to the first interior surface, and determine an orientation solution for an object based on information provided by the inertial-sensor assembly and the determined angle of displacement of the first exterior surface with respect to the first interior surface.

11. The system of claim 10, wherein the instructions, when executed by the electronic device coupled to the at least one of the first and second sensor elements, further enable the device to:

determine, based on the generated second signal, a second angle of displacement of the second exterior surface with respect to the second interior surface, and determine the orientation solution for the object based on information provided by the inertial-sensor assembly and the determined second angle of displacement of the first exterior surface with respect to the first interior surface.

12. The system of claim 10, wherein the first interior surface is orthogonal to the second interior surface; and wherein the first exterior surface is orthogonal to the second exterior surface.

13. A method implementable in an apparatus coupled to an object and operable to provide information pertaining to the orientation of the object, the apparatus including a chassis and an inertial-sensor assembly non-rigidly mounted within the chassis, the method comprising the steps of:

mounting a first sensor element to a first interior surface of the chassis;

mounting a second sensor element to a first exterior surface of the inertial-sensor assembly, at least one of the first and second sensor elements configured to generate a first signal corresponding to a distance of displacement of the second sensor element with respect to the first sensor element;

determining, based on the generated first signal, an angle of displacement of the first exterior surface with respect to the first interior surface; and determining an orientation solution for the object based on information provided by the inertial-sensor assembly and the determined angle of displacement of the first exterior surface with respect to the first interior surface.

14. The method of claim 13, wherein the first sensor element comprises a first capacitor plate and the second sensor element comprises a second capacitor plate.

15. The method of claim 13, wherein the first sensor element comprises a conductive coil and the second sensor element comprises a core.

16. An apparatus for providing information pertaining to the orientation of an object to which the apparatus is coupled, the apparatus comprising:

a chassis having a first interior surface;

an inertial-sensor assembly disposed within the chassis and having a first exterior surface;

a first sensor element mounted on the first interior surface;

a second sensor element mounted on the first exterior surface, at least one of the first and second sensor elements configured to generate a first signal corresponding to a distance of displacement of the second sensor element with respect to the first sensor element;

a third sensor element mounted on the first interior surface; and a fourth sensor element mounted on the first exterior surface, at least one of the third and fourth sensor elements configured to generate a second signal corresponding to a distance of displacement of the fourth sensor element with respect to the third sensor element.

17. The apparatus of claim 16, further comprising a processing device coupled to at least one of the first and second sensor elements and configured to determine, based on the generated first signal, an angle of displacement of the first exterior surface with respect to the first interior surface.

18. An apparatus for providing information pertaining to the orientation of an object to which the apparatus is coupled, the apparatus comprising:

a chassis having a first interior surface;

an inertial-sensor assembly disposed within the chassis and having a first exterior surface;

a first sensor element mounted on the first interior surface;

a second sensor element mounted on the first exterior surface, at least one of the first and second sensor elements configured to generate a first signal corresponding to a distance of displacement of the second sensor element with respect to the first sensor element;

wherein the first sensor element comprises a first capacitor plate and the second sensor element comprises a second capacitor plate; and a processing device coupled to at least one of the first and second sensor elements and configured to determine, based on the generated first signal, an angle of displacement of the first exterior surface with respect to the first interior surface.

* * * * *